J. L. OGDEN, Jr.
DINNER PAIL.
APPLICATION FILED MAR. 6, 1915.

1,203,774.

Patented Nov. 7, 1916.

Witnesses:
Leonard E. Bogue
A. A. Olson

Inventor
James L. Ogden Jr.
By [signature]
His attorney.

UNITED STATES PATENT OFFICE.

JAMES L. OGDEN, JR., OF NAUVOO, ILLINOIS.

DINNER-PAIL.

1,203,774.  Specification of Letters Patent.  Patented Nov. 7, 1916.

Application filed March 6, 1915. Serial No. 12,551.

*To all whom it may concern:*

Be it known that I, JAMES L. OGDEN, Jr., a citizen of the United States, and a resident of the town of Nauvoo, county of Hancock, and State of Illinois, have invented certain new and useful Improvements in Dinner-Pails, of which the following is a specification.

My invention relates to improvements in dinner pails, and has for its object the production of a device of this character which will be of improved construction and efficient in use.

Other objects will appear hereinafter.

The invention consists in the combinations and arrangements of parts hereinafter described and claimed.

Figure 1:
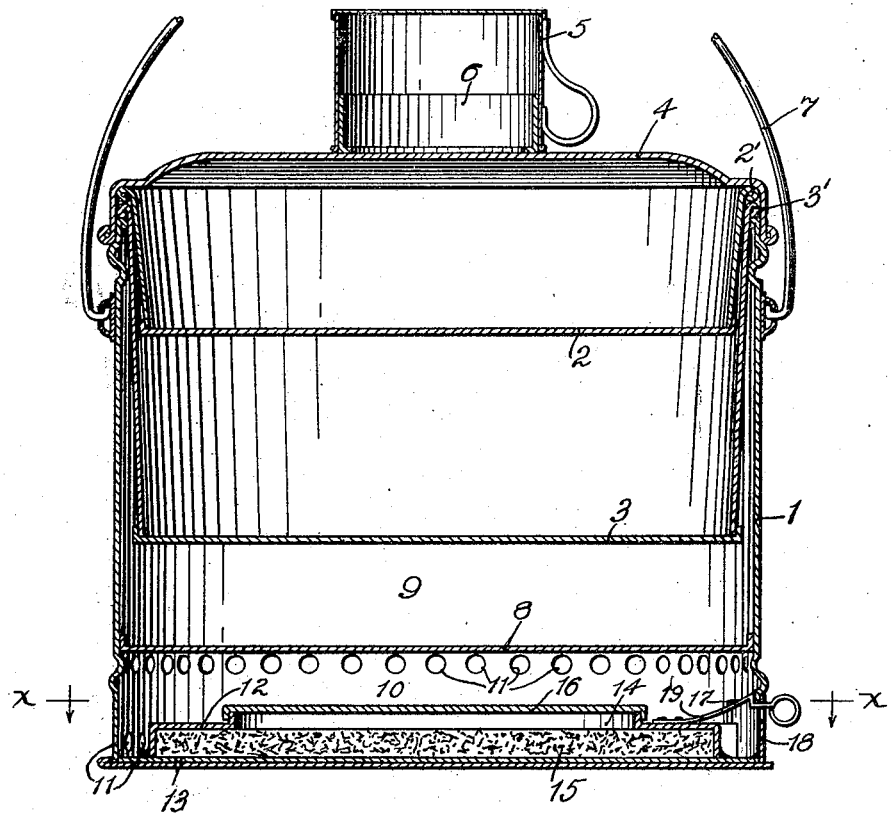
Figure 2:
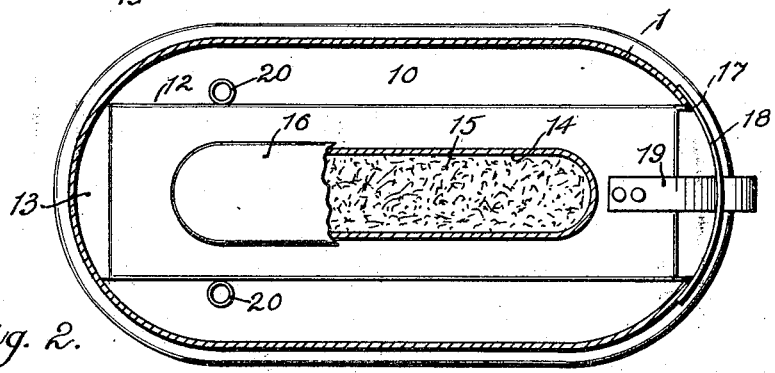

The invention will be best understood by reference to the accompanying drawing forming a part of this specification, and in which, Figure 1 is a central vertical section of a dinner pail embodying the invention, and Fig. 2 is a section taken on substantially line *x—x* of Fig. 1.

The preferred form of construction, as illustrated in the drawing, comprises a vessel or body 1 which is open at its upper side. Arranged in the upper end of said vessel are two telescoping receptacles or trays 2 and 3 which taper toward their lower ends and which are provided at their upper edges with outwardly projecting beads 2' and 3' for support upon the upper edge of the vessel 1. The upper end of vessel 1 is provided with a removable cover 4 upon which is mounted a cup 5 held in position upon said cover by frictional engagement with a circular flange 6 which arises from the upper side of said cover. A suitable bail or handle 7 engages with opposite sides of the vessel 1, as shown.

The interior of vessel 1 is divided by a horizontal imperforate partition 8 into a superjacent food compartment 9 and a subjacent heating chamber 10. Formed in the lateral walls of vessel 1 are ventilation openings 11 which communicate with the chamber 10.

Removably mounted in the chamber 10 is a heating element or stove consisting of a comparatively flat wide body formed of an upper part 12 in the form of an inverted tray, the lower edges of the part 12 being suitably secured as by soldering to a base plate 13. Formed centrally in the upper side of said heating element is an elongated opening 14 through which the fuel vapor may escape from the asbestos wick 15 provided in the body of said element.

The fuel employed is preferably alcohol, said wick being saturated with the same preparatory to use. In order to prevent evaporation of the alcohol or other liquid fuel employed, when the device is not in use, a closure 16 is provided having a depending flange, as shown, which is adapted to snugly embrace an upwardly extending flange which surrounds the opening 14. The closure 16 also serves as a means of extinguishing the flame, when the operation of the heating element is no longer desired.

Formed in the lateral wall of the vessel 1, at the lower end thereof, is an opening 17 communicating with the chamber 10 through which the heating element may be inserted or removed. At the front end of the heating element is provided a curved plate 18 adapted, when the heating element is in operative position, to close the opening 17, as clearly shown in the drawing. Provided at the front end of the heating element is also a resilient detent 19 adapted, when the heating element is in operative position, to engage with the lateral wall of vessel 1 at the upper edge of the opening 17 in order to lock the heating element in position in chamber 10. The outer end of member 19 projects exteriorly, constituting a handle for moving said detent to releasing position, and also as a handle to facilitate removal or insertion of the heating element. Arising from the bottom of chamber 10 are two posts 20 which are adapted for engagement with opposite sides of the inner end portion of the heating element to hold the same against lateral shifting.

The arrangement set forth is simple and economical in construction and hence may be manufactured at a low cost. The heating element is of compact design and adapted, when in use, to contain a sufficient quantity of alcohol to supply the heat required for preparing a meal such as is carried in a dinner pail of the character in question. Through the provision of the closure tightly fitting the opening in the heating element, the evaporation of the alcohol, in transit, is eliminated, and hence waste prevented. The locking of the heating element is simple and efficient for the purpose.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

A dinner pail comprising a vessel open at its upper side; a horizontal imperforate partition in said vessel dividing the interior thereof into a superjacent food compartment and a subjacent heating chamber, there being ventilation openings in the lateral walls of said vessel communicating with said chamber; a heating element removably mounted in said chamber, there being an opening in the lateral wall of said vessel communicating with said chamber through which said heating element may be inserted and removed; and a resilient detent on said heating element adapted for releasable engagement with the lateral wall of said vessel at said opening, for releasably locking said heating element in position in said chamber, said detent projecting exteriorly to constitute a handle, substantially as described.

In testimony whereof I have signed my name to this specification in the presence of two subscribing witnesses.

JAMES L. OGDEN, Jr.

Witnesses:
W. C. REINHOLD, Sr.,
W. C. REINHOLD, Jr.